US009440398B2

(12) United States Patent
Lin

(10) Patent No.: US 9,440,398 B2
(45) Date of Patent: Sep. 13, 2016

(54) AUTOMATIC LIQUID SUPPLY APPARATUS FOR 3D PRINTING AND LIQUID LEVEL SENSOR THEREOF

(71) Applicants: XYZPRINTING, INC., New Taipei (TW); KINPO ELECTRONICS, INC., New Taipei (TW); CAL-COMP ELECTRONICS & COMMUNICATIONS COMPANY LIMITED, New Taipei (TW)

(72) Inventor: Tsai-Yi Lin, New Taipei (TW)

(73) Assignees: XYZPRINTING, INC., New Taipei (TW); KINPO ELECTRONICS, INC., New Taipei (TW); CAL-COMP ELECTRONICS & COMMUNICATIONS COMPANY LIMITED, New Taipei (TW)

( * ) Notice: Subject to any disclaimer, the term of this patent is extended or adjusted under 35 U.S.C. 154(b) by 30 days.

(21) Appl. No.: 14/607,779

(22) Filed: Jan. 28, 2015

(65) Prior Publication Data

US 2016/0151968 A1 Jun. 2, 2016

(30) Foreign Application Priority Data

Nov. 28, 2014 (CN) .......................... 2014 1 0709573

(51) Int. Cl.
*B29C 67/00* (2006.01)
*G01F 23/36* (2006.01)
*B33Y 40/00* (2015.01)

(52) U.S. Cl.
CPC ....... *B29C 67/0055* (2013.01); *B29C 67/0059* (2013.01); *B29C 67/0085* (2013.01); *B33Y 40/00* (2014.12); *G01F 23/36* (2013.01); *G01F 23/363* (2013.01)

(58) Field of Classification Search
CPC ... B29C 67/0055; B33Y 30/00; B33Y 40/00; G01F 23/36; B67D 1/1247
USPC ....................................... 222/51, 67; 73/317
See application file for complete search history.

(56) References Cited

U.S. PATENT DOCUMENTS 1,615,647 A * 1/1927 Pierce ..................... G01F 23/36 200/84 R
3,411,554 A * 11/1968 Wilson .................... F25C 1/225 141/351
4,116,128 A * 9/1978 Lehmann ................ B41F 35/06 101/364
7,856,875 B2 * 12/2010 Jeon ........................ A47J 27/04 73/290 R

FOREIGN PATENT DOCUMENTS

FR 2563336 A1 * 10/1985 ........... G01F 23/303

OTHER PUBLICATIONS

Partial machine translation of FR2563336 A1 dated Oct. 1985 obtained from the espace webpage.*

* cited by examiner

*Primary Examiner* — Robert B Davis
(74) *Attorney, Agent, or Firm* — Chun-Ming Shih; HDLS IPR Services

(57) ABSTRACT

An automatic liquid supply apparatus for supplying liquid material during 3D printing is provided. The automatic liquid supply apparatus includes: a container including an accommodating space for containing the liquid material, the accommodating space including a recess and a trench communicating with each other, the trench having an inner bottom face, the recess being recessed to a depth below the inner bottom face; a liquid level sensor including a floater, the floater being disposed corresponding to the recess and floating to rise and fall along with a liquid level, the liquid level sensor sensing the liquid level in the accommodating space; and a liquid dispenser electrically connected to the liquid level sensor, the liquid dispenser selectively supplying or stopping supplying the liquid material into the accommodating space according to the sensed liquid level.

9 Claims, 10 Drawing Sheets

AUTOMATIC LIQUID SUPPLY APPARATUS FOR 3D PRINTING AND LIQUID LEVEL SENSOR THEREOF

BACKGROUND

1. Technical Field

The technical field relates to supplying of liquid material for 3D printing and, in particular, to an automatic liquid supply apparatus for 3D printing and a liquid level sensor thereof.

2. Related Art 3D printing relates to a quick shaping technique, also called "additive manufacturing (AM)" or "layer manufacturing". According to a digital model file, 3D printing uses moldable materials, such as metallic powders or plastic, to build an object layer by layer based on parameters of the model file, thereby manufacturing a three dimensional solid model in any shape.

Since there are different shaping technologies for 3D printing, the 3D printing can be carried out by different ways. One way is to emit high-energy light beam to photosensitive resin, so as to form various hard slices to build a desired three dimensional solid model layer by layer.

According to the conventional 3D printing technology, any hard slice is formed by manually dispensing the photosensitive resin into a shaping tank until a predetermined liquid level is reached, which is quite troublesome and inconvenient. The photosensitive resin in the shaping tank may even be too much or insufficient from time to time, which is a well-known drawback since long time ago.

In view of the foregoing, the inventor made various studies to improve the above-mentioned problems to overcome the above-mentioned drawback, on the basis of which the disclosed example is accomplished.

BRIEF SUMMARY

The disclosure is directed to an automatic liquid supply apparatus for 3D printing and a liquid level sensor thereof, which can automatically and precisely supply or stop supplying liquid material (e.g. photosensitive resin), so the disclosed example can obviate the necessity of manually dispensing liquid, and is labor-saving and convenient.

According to one exemplary embodiment of the present invention, an automatic liquid supply apparatus is provided for supplying liquid material during 3D printing. The automatic liquid supply apparatus comprises: a container including an accommodating space for containing the liquid material, the accommodating space including a trench and a recess communicating with each other, the trench including an inner bottom face, the recess being recessed to a depth below the inner bottom face; a liquid level sensor including a floater, the floater being disposed corresponding to the recess and floating on the liquid material to generate floating movement along with a liquid level of the liquid material, the liquid level sensor sensing the liquid level of the liquid material in the accommodating space according to floating movement of the floater; and a liquid dispenser electrically connected to the liquid level sensor, the liquid dispenser selectively supplying or stopping supplying the liquid material into the accommodating space according to the sensed liquid level.

According to one exemplary embodiment of the present invention, a liquid level sensor for an automatic liquid supply apparatus is provided for sensing a liquid level of liquid material during 3D printing, the liquid level sensor comprising: a floater floating on the liquid material to generate upward and downward floating movement along with the liquid level of the liquid material; a sensor producing a sensing signal; and a linkage member including a holder, a first linkage and a second linkage, the first linkage and the second linkage being pivotally connected to the holder, wherein the first linkage includes a connection portion and a driving portion, the connection portion being connected to the floater, the floater driving the first linkage to move; the second linkage includes a driven portion and an interception portion, the second linkage being moved by the driving portion via the driven portion, the interception portion selectively intercepting or not intercepting the sensing signal according to the movement of the second linkage.

Compared to conventional techniques, the exemplary embodiment has the effect of automatically and precisely supplying or stopping supplying the liquid material without the necessity of dispensing the liquid manually, thus being labor-saving and convenient.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

In the following, detailed descriptions along with accompanied drawings are given to better explain the features and technical contents of the example embodiment. However, the following descriptions and the accompanied drawings are for reference and illustration only, and are not intended to limit the scope of the example embodiment.

Figure 1:
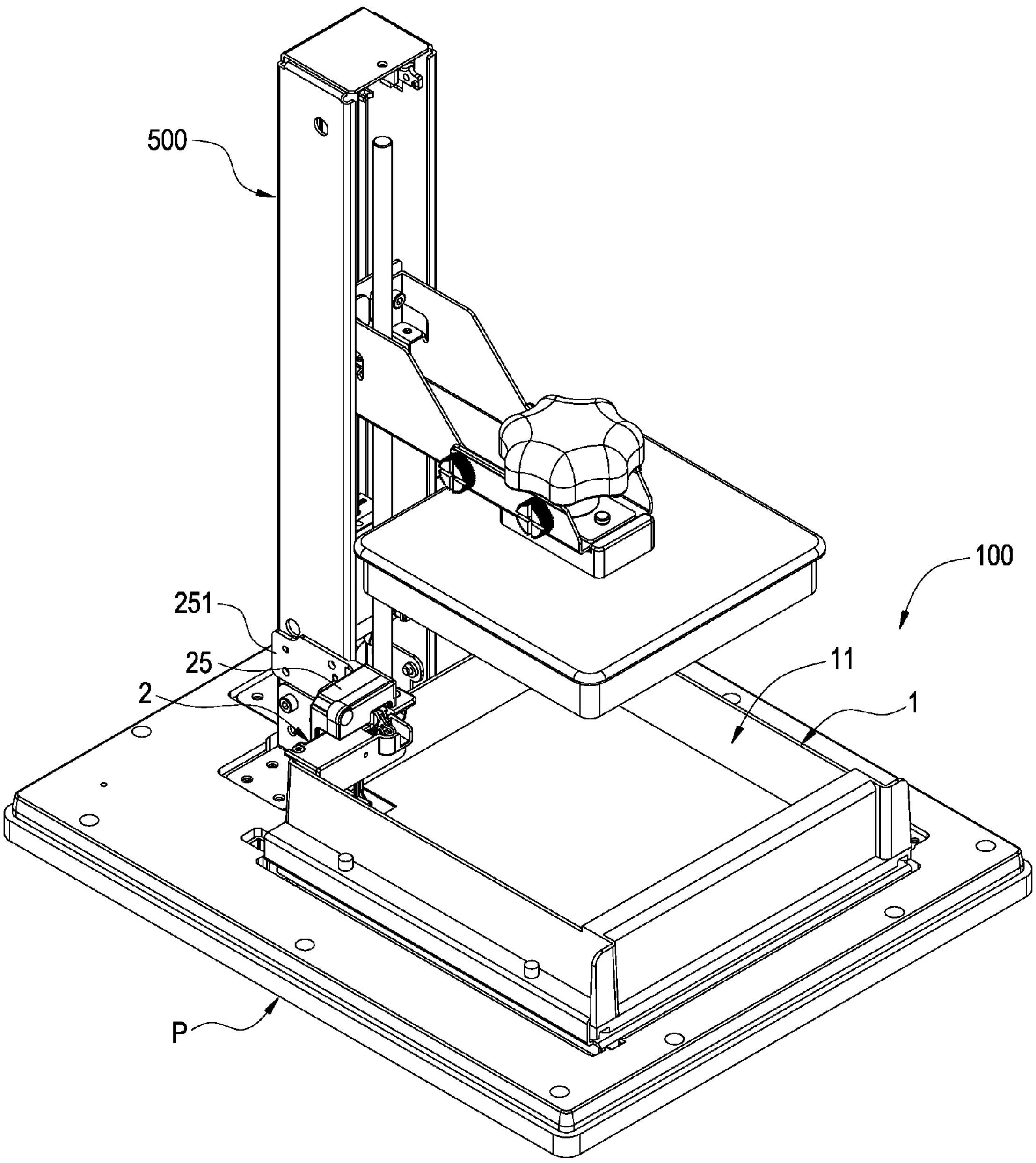
FIG. 1 is a perspective view of one exemplary embodiment from one viewing angle according to the present invention.
Figure 2:
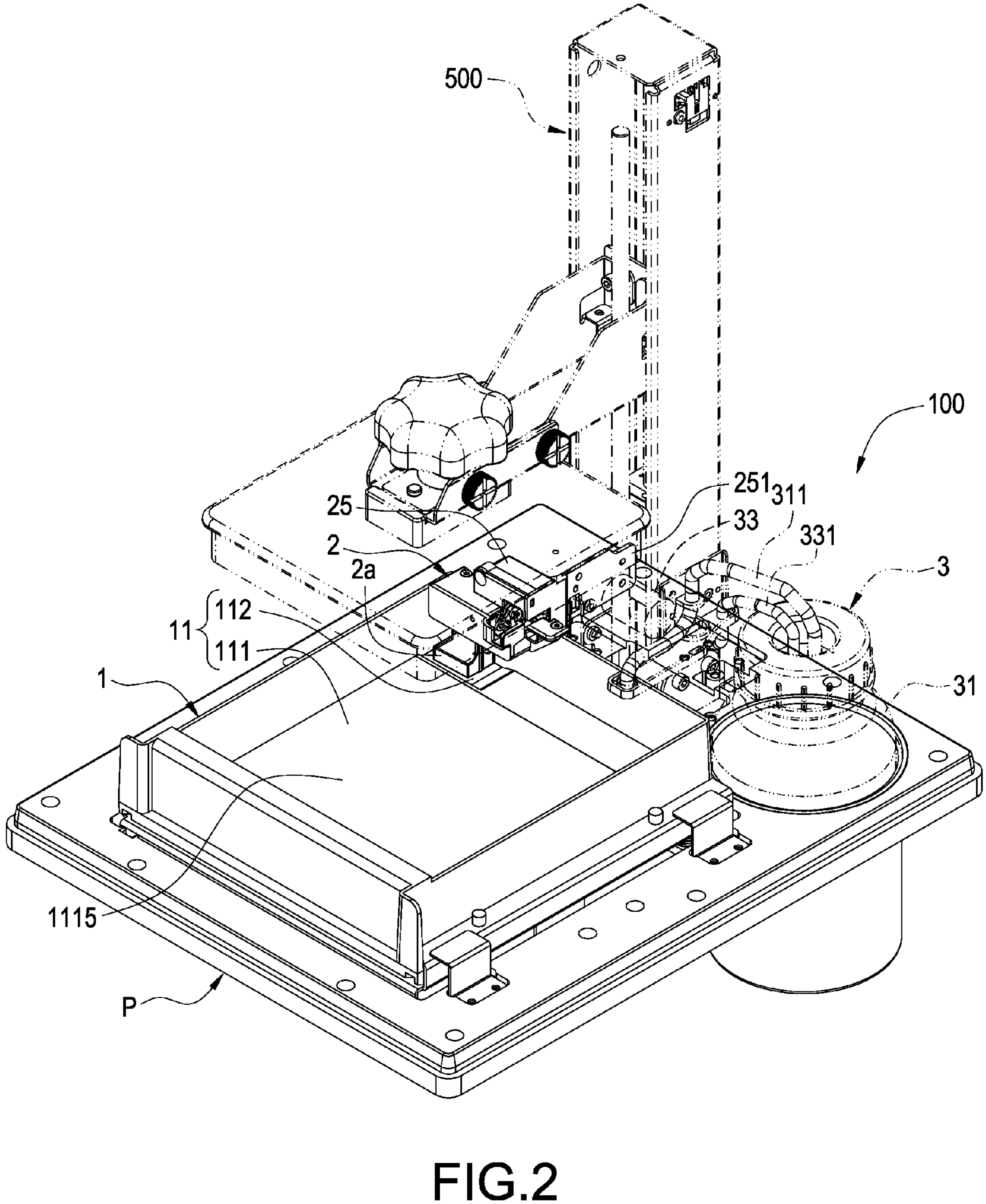
FIG. 2 is a perspective view from another viewing angle, showing an automatic liquid supply apparatus thereof.

The disclosure is directed to an automatic liquid supply apparatus for 3D printing and a liquid level sensor thereof. Referring to FIGS. 1 and 2 showing a portion of a 3D printer, in which an automatic liquid supply apparatus 100 and an elevator 500 are disposed on a machine table P. The automatic liquid supply apparatus 100 supplies liquid material (e.g. photosensitive resin) during 3D printing. According to one exemplary embodiment of the present invention, the automatic liquid supply apparatus 100 comprises a container 1, a liquid level sensor 2, and a liquid dispenser 3. The container 1 and the liquid dispenser 3 are both disposed on the machine table P. The liquid level sensor 2 is partially disposed in the container 1 and partially disposed in the elevator 500 (detailed descriptions are provided below in cooperation with FIG. 1 and FIG. 2.). Certainly, the liquid level sensor 2 can be otherwise disposed entirely in the container 1, disposed entirely in the elevator 500, or disposed entirely in the machine table P (not illustrated), and the disclosure is not intended to limit the disposal of the liquid level sensor 2.

Figure 3:
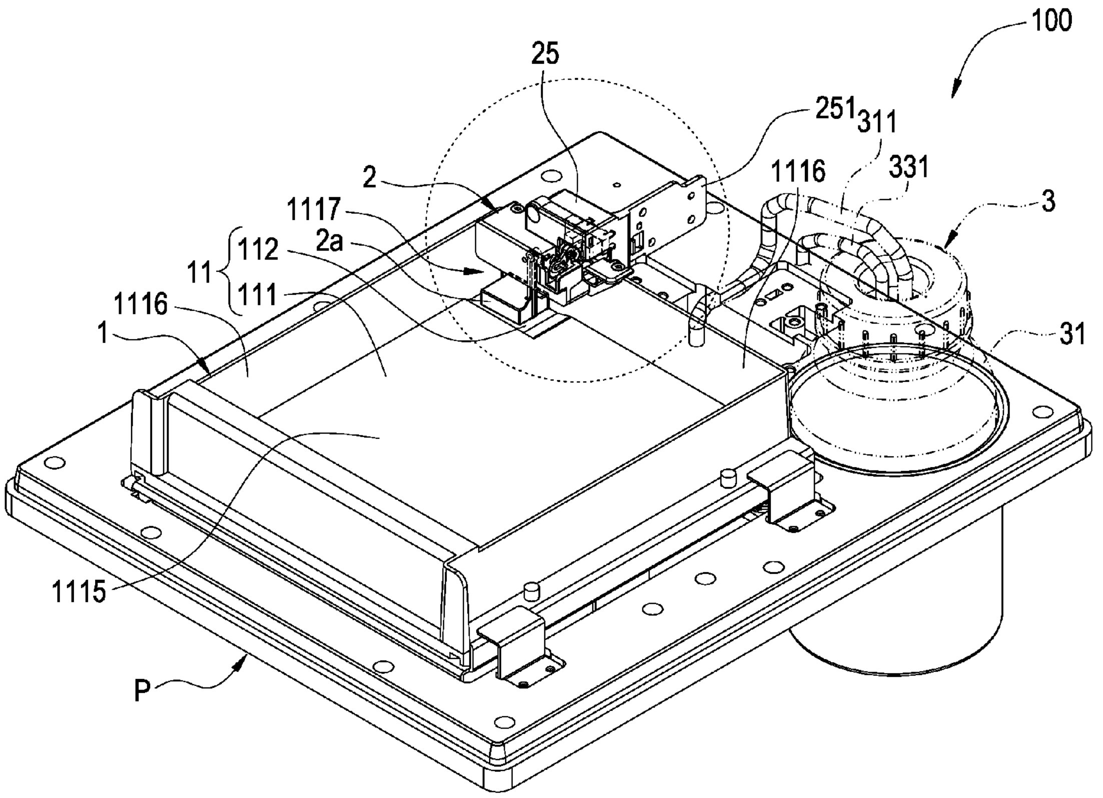
FIG. 3 is a perspective view showing the automatic liquid supply apparatus according to the exemplary embodiment of the present invention.
Figure 5:
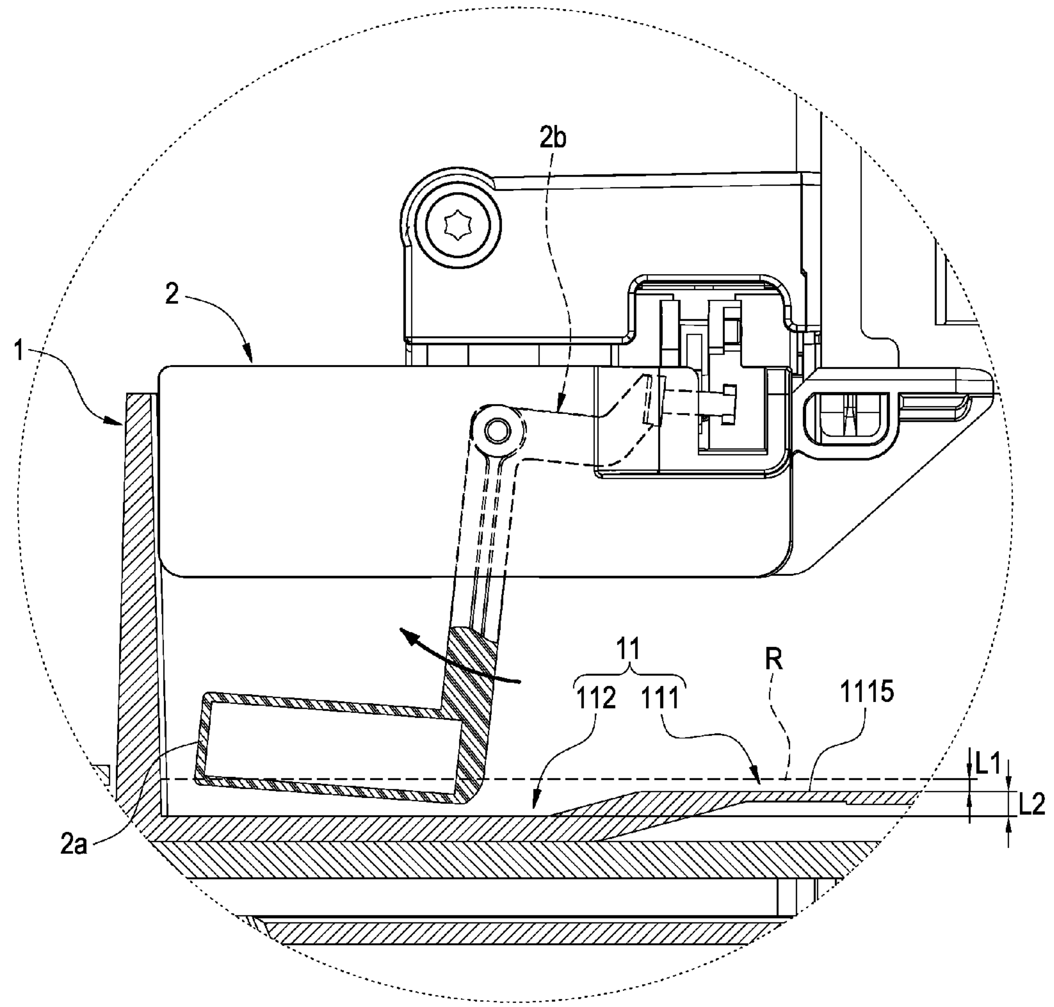
FIG. 5 is a cross-sectional view showing a status after dispensing of the liquid material according to the exemplary embodiment of the present invention.

Referring to FIGS. 2 and 3, the container 1 includes an accommodating space 11 for containing the liquid material (R, shown in FIG. 5). The accommodating space 11 includes a trench 111 and a recess 112 communicating with each other. The trench 111 includes an inner bottom face 1115. The recess 112 is recessed to a depth L2 (as shown in FIG. 5) below the inner bottom face 1115.

The trench 111 includes a plurality of inner walls 1116 surrounding the periphery of the inner bottom face 1115. Furthermore, an including angle area 1117 (see FIG. 3 or FIG. 6) is formed between any two adjacent ones of the inner walls 1116 of the trench 111. The recess 112 is disposed adjacent to any of the inner walls 1116 (not illustrated). According to the present exemplary embodiment, the recess 112 is disposed in any including angle area 117, as an example for illustration. An inclined slope 1121 can be further connected between the recess 112 and the inner bottom face 1115, so that the liquid material R can easily flow into the recess 112 from the trench 111.

The liquid level sensor 2 is a floating-type liquid level sensor, thus including a floater 2A. The liquid level sensor 2 can be disposed in the container 1 (but the example embodiment is not limited by this description). The floater 2*a* is correspondingly disposed over the recess 112 (see FIGS. 4 and 5). When dispensing the liquid material R into the accommodating space 11 of the container 1, the floater 2*a* floats, corresponding to the recess 112, on the liquid material R to generate upward and downward floating movement along with a liquid level of the liquid material R. The liquid level sensor 2 senses the liquid level of the liquid material R in the accommodating space 11 according to a position of the floater 2*a* in the upward or downward floating movement.

The liquid dispenser 3 is a controllable-type liquid dispenser, controlled to supply or stop supplying the liquid material R. The liquid dispenser 3 includes a liquid storage bucket 31 and a controller 33 (see FIG. 2) both disposed in the machine table P. A liquid conveyance pipe 311 is connected from the liquid storage bucket 31 to the accommodating space 11 to dispense the liquid material R in the liquid storage bucket 31 into the accommodating space 11 via the liquid conveyance pipe 311. A control pipe 331 is connected from the controller 33 (e.g. a control valve) to the liquid storage bucket 31, so that the controller 33 can control the pressure inside the liquid storage bucket 31 by the control pipe 331, thereby controlling to supply or stop supplying the liquid material R in the liquid storage bucket 31 to the accommodating space 11.

The liquid level sensor 2 is electrically connected to the controller 33 of the liquid dispenser 3, so that the controller 33 can control to supply or stop supplying the liquid material R into the accommodating space 11 according to the liquid level sensed by the liquid level sensor 2.

Figure 4:
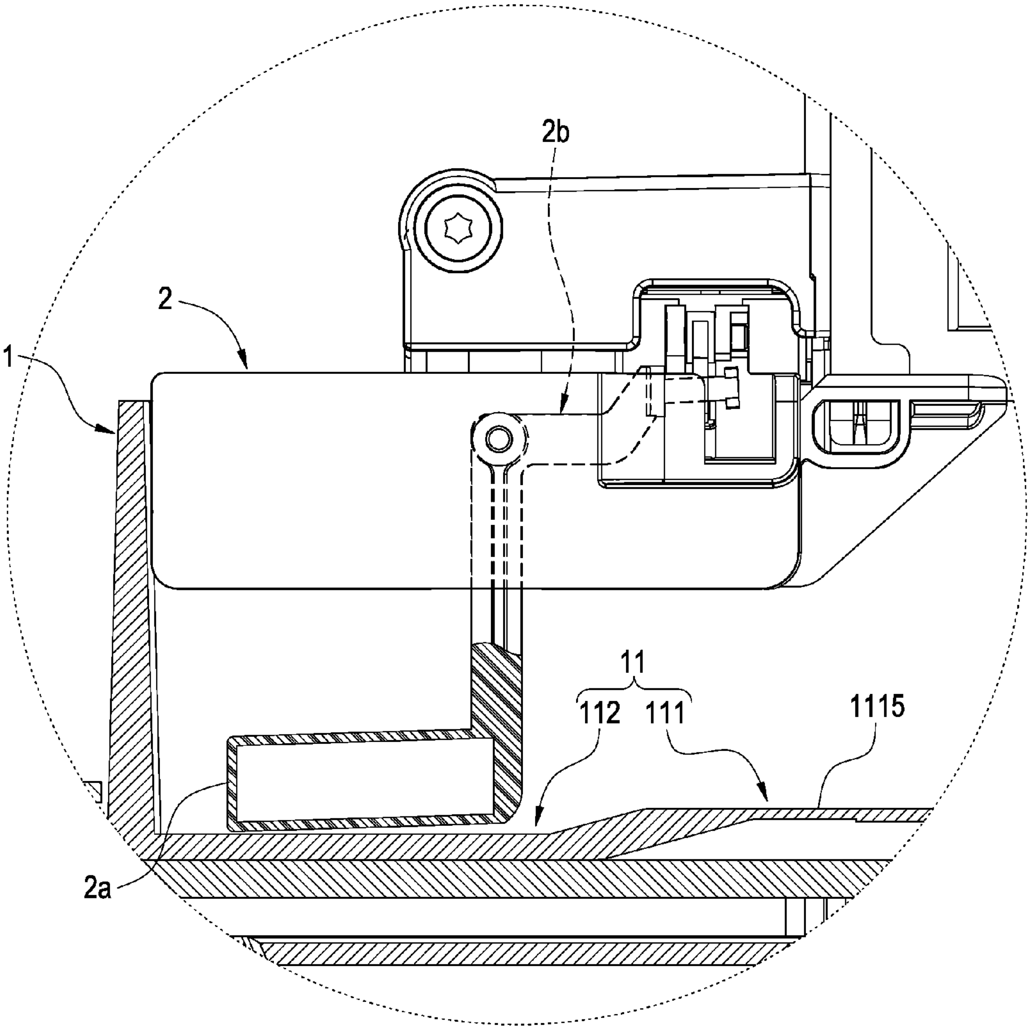
FIG. 4 is a cross-sectional view based on FIG. 3 showing a status before dispensing of liquid material according to the exemplary embodiment of the present invention.

Referring to FIG. 4, when the liquid material R is not yet dispensed into the accommodating space 11 of the container 1, the floater 2*a* hangs naturally corresponding to the recess 112. At this time, the liquid level sensed by the liquid level sensor 2 is a low liquid level, so the liquid dispenser 3 is controlled to start to dispense the liquid material R into the accommodating space 11.

It should be noted that, the recess 112 is recessed into a depth L2 below the inner bottom face 1115 of the trench 111, and the floater 2*a* is correspondingly disposed over the recess. Therefore, the floating force of the floater 2*a* is derived from the liquid level height L1 of the liquid material R in the recess 111 and the depth L2 of the recess 112 filled with the liquid material R. That is to say, depth or height L1+L2 is used to generate a greater floating force, and thus the liquid level can be sensed precisely, thereby precisely supplying or stopping supplying the liquid material R. By contrast, the conventional container 1 for 3D printing only includes the recess 111, so the depth causing the floating force is obviously insufficient. Thus, even if a liquid level sensor is added, the floating force is only derived from the liquid level height L1 of the liquid material R in the recess 111, resulting in that the floating force for conventional 3D printing is insufficient to enable precise sensing of the liquid level.

In addition, since the liquid material R in the liquid storage bucket 31 will be used up, it is necessary to sense this situation, and the following descriptions are provided to exemplify the sensing method. First, a predetermined time is set. The predetermined time (e.g. 20 seconds) is the time required for the liquid dispenser 3 to dispense the liquid material R into the accommodating space 11 until reaching the liquid level height L1. If the duration for sensing the liquid level of the automatic liquid supply apparatus 100 is over the predetermined time and is delayed for a period of time (e.g. 10 seconds; that is to say, dispensing of the liquid material R already lasts for 30 seconds), but the liquid level sensor 2 not yet senses reaching of the predetermined liquid level height, it means that the liquid material R in the liquid storage bucket 31 is used up, so a warning signal is sent out to inform the user to change the liquid storage bucket 31.

Figure 6:
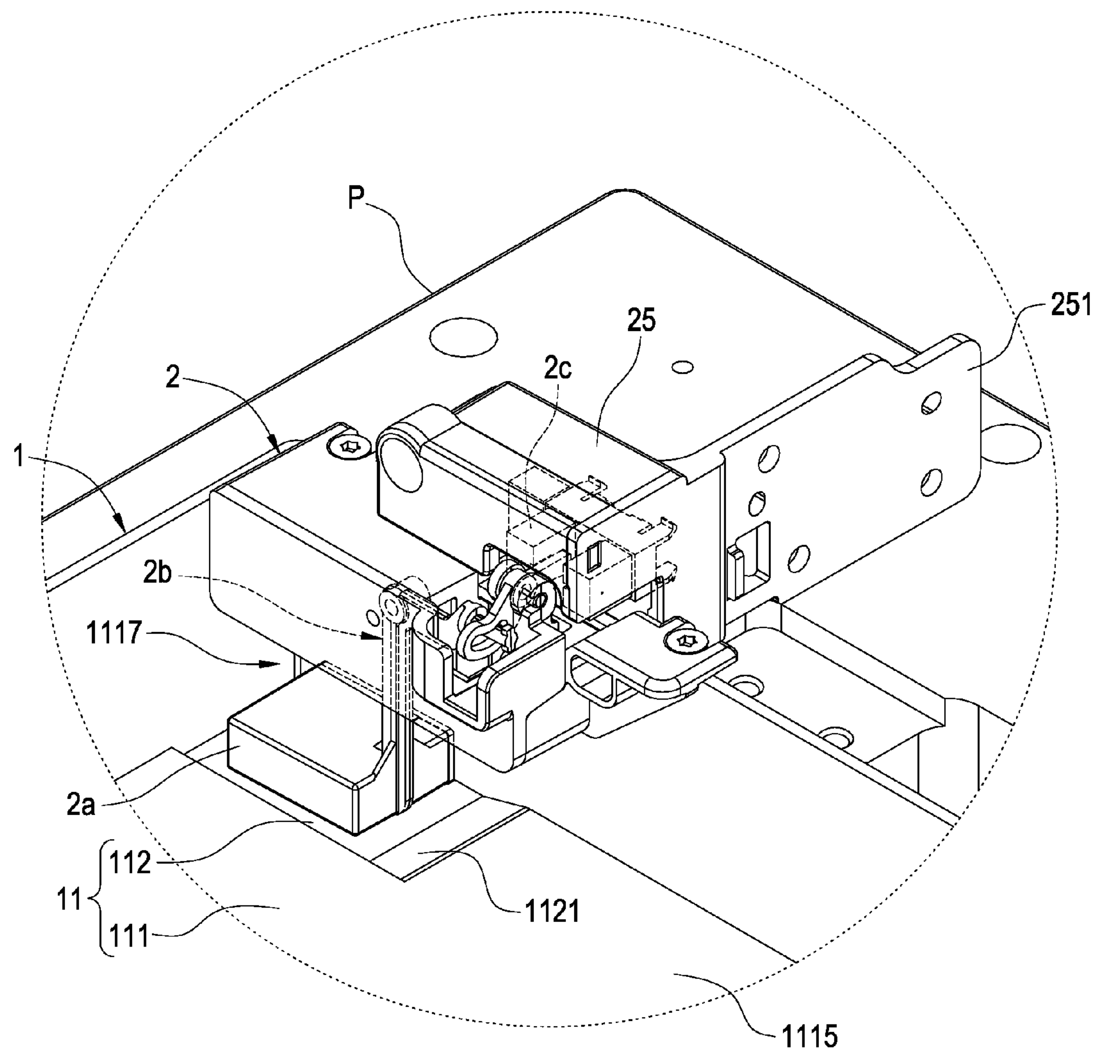
FIG. 6 is a partially enlarged view based on FIG. 3, showing a liquid level sensor according to the exemplary embodiment of the present invention.
Figure 7:
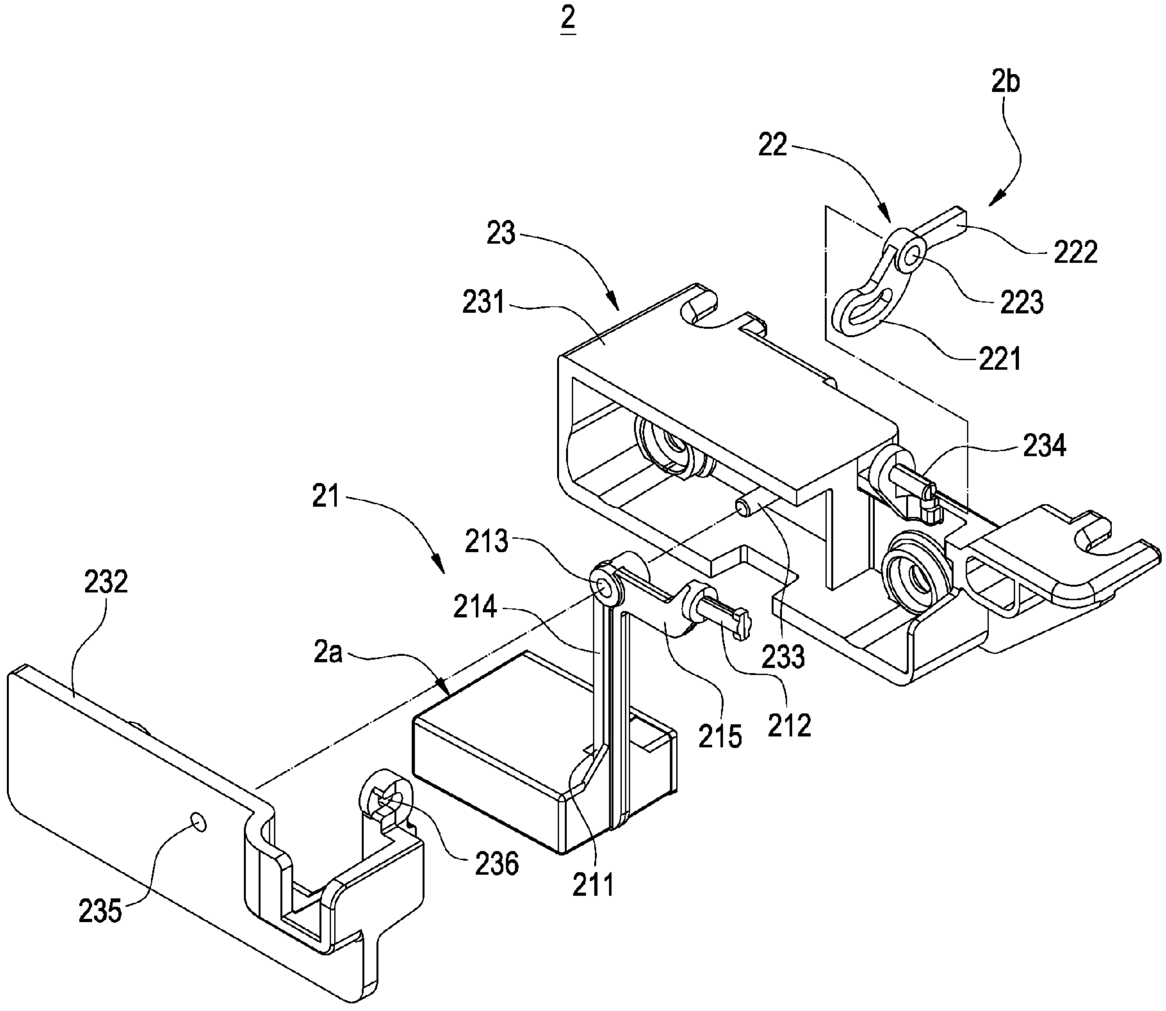
FIG. 7 is a first perspective exploded view of the liquid level sensor according to the exemplary embodiment of the present invention.
Figure 8:
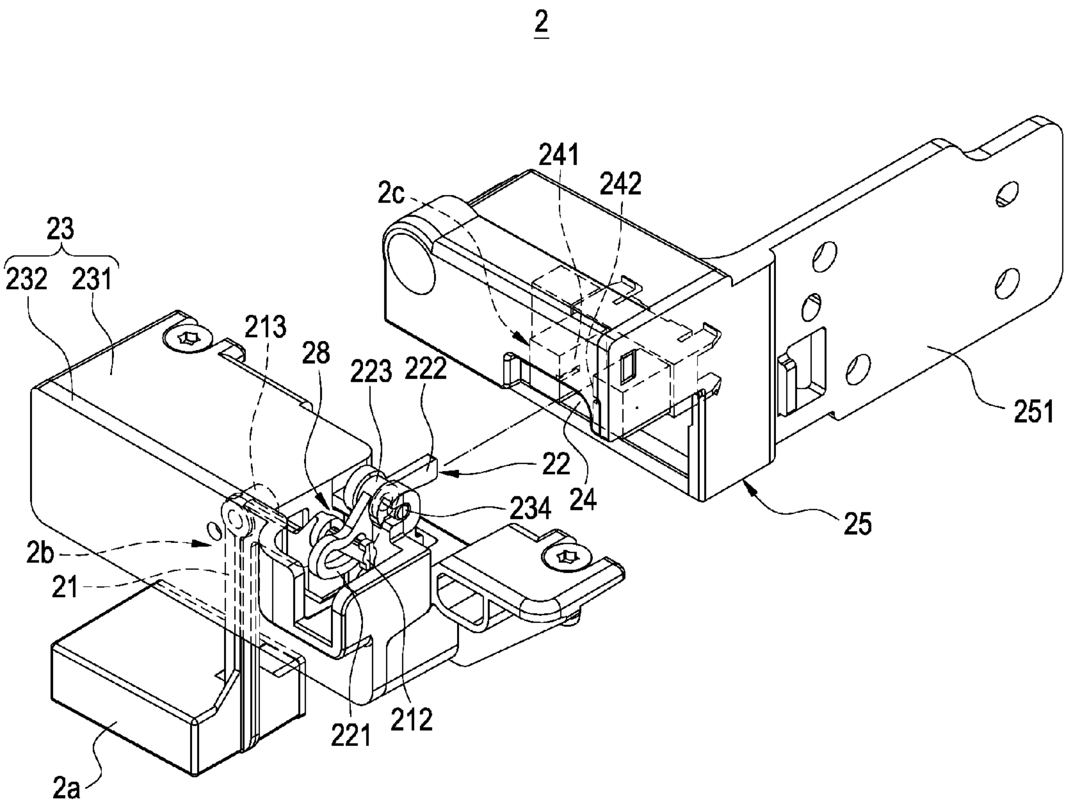
FIG. 8 is a second perspective exploded view of the liquid level sensor according to the exemplary embodiment of the present invention.

Please refer to FIGS. 6, 7 and 8 which show the liquid level sensor 2 of the automatic liquid supply apparatus 100 according to the exemplary embodiment of the present invention. In addition to the foregoing floater 2*a*, the liquid level sensor 2 includes a linkage member 2*b* and a sensor 2*c*.

The sensor 2*c* can be a various types of sensors. In the present embodiment, the sensor 2*c* is an interception-type sensor as an example for illustration. Furthermore, referring to FIG. 6 and FIG. 8 in cooperation with FIG. 2, the sensor 2*c* is disposed at the supporting member 25, and the supporting member 25 includes a fixed portion 251 fixed to the elevator 500, so that the sensor 2*c* is disposed at the elevator 500 via the supporting member 25.

The sensor 2*c* is used to generate a sensing signal (not illustrated). In detail, the sensor 2*c* includes an opening 24, the sensor 2*c* includes two side walls 241, 242 corresponding to each other at the opening 24. The sensor 2*c* transmits the sensing signal from the side wall 241 to the other side wall 242 for receipt. When the sensing signal is not intercepted and transmitted and received normally, it means that the liquid level is at the predetermined liquid level height (see FIG. 10). When the linkage member 2*b* intercepts the sensing signal corresponding to the opening 24, it means that the liquid level is at the foregoing low liquid level (see FIG. 9).

The linkage member 2*b* is disposed between the floater 2*a* and the sensor 2*c* in a manner such that the floater 2*a* drives the linkage member 2*b* to move, thereby intercepting or not intercepting the sensing signal of the sensor 2*c*. The linkage member 2*b* includes a holder 23 and a first linkage 21 and a second linkage 22. The first linkage 21 and the second linkage 22 are pivotally connected to the holder 23.

The first linkage 21 includes a connection portion 211 and a driving portion 212, and it preferably also includes a first pivot portion 213. The first pivot portion 213 is disposed between the connection portion 211 and the driven portion 212. The first pivot portion 213 is pivotally connected to the holder 23, the connection portion 211 is connected to the floater 2*a*, so that the first linkage 21 is driven by the floater 2*a* to move, like a seesaw, about the first pivot portion as an axis.

The second linkage 22 includes a driven portion 221 and an interception portion 222, and it preferably further includes a second pivot portion 223. The second pivot portion 223 is disposed between the driven portion 221 and the interception portion 222. The second pivot portion 223 is pivotally connected to the holder 23. The driven portion 221 and the foregoing driving portion 212 are movably connected to each other. The interception portion 222 correspondingly extends into the opening 24 of the sensor 2*c*, so that the driven portion 221 is driven by the driving portion 212 to make the second linkage 22 move like a seesaw. The interception portion 222 intercepts or not intercepts the foregoing sensing signal according to the movement of the second linkage 22 (see FIG. 9 and FIG. 10).

Figure 9:
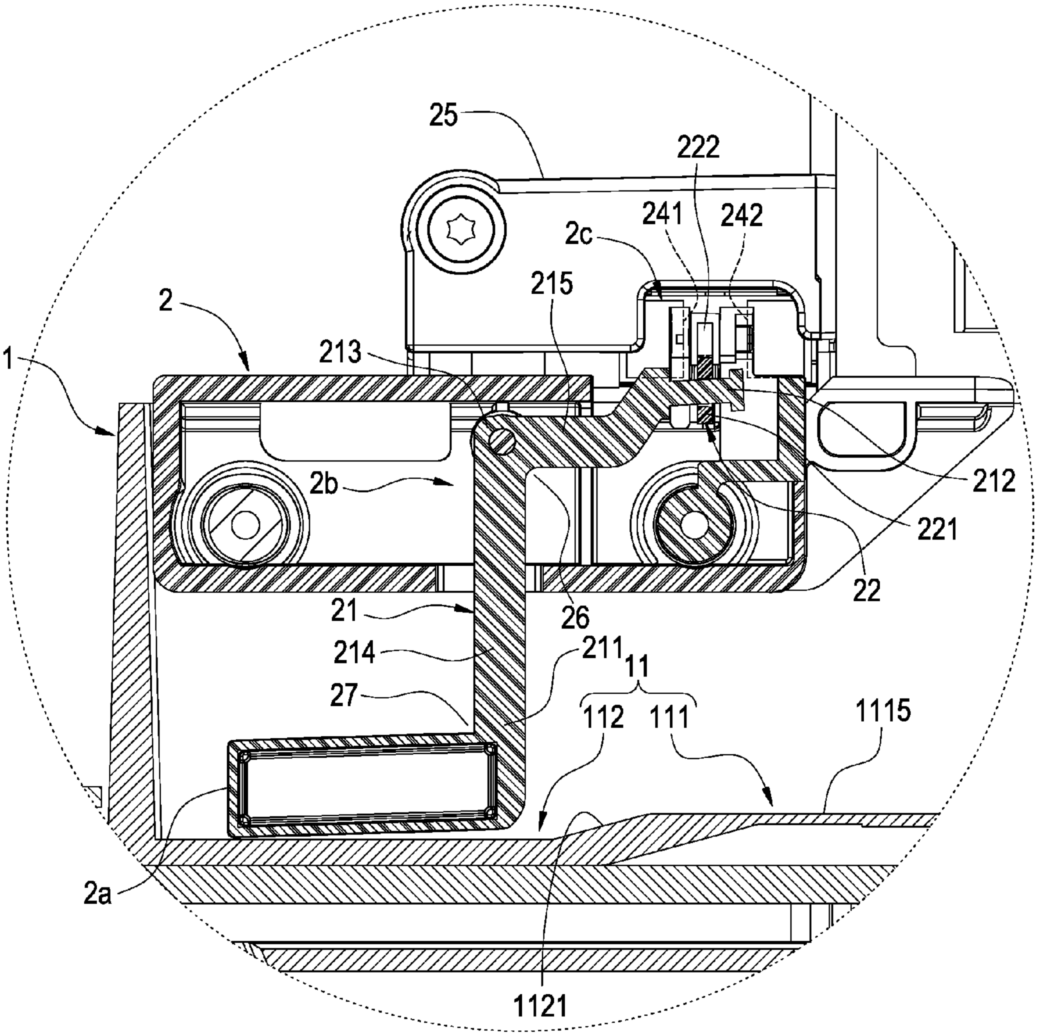
FIG. 9 is a cross-sectional view of the liquid level sensor, before dispensing of the liquid material.

Referring to FIG. 9, when the liquid material R is not yet dispensed into the accommodating space 11 of the container 1, the floater 2*a* hangs naturally corresponding to the recess 112. At this time, the floater 2*a* drives the first linkage 21 toward a direction and drives the second linkage 22 to move, thus to make the interception portion 222 intercept the sensing signal of the sensor 2*c*, and it means that at this time the liquid level is at the low liquid level, and therefore the liquid dispenser 3 starts to dispense the liquid material R into the accommodating space 11.

Figure 10:
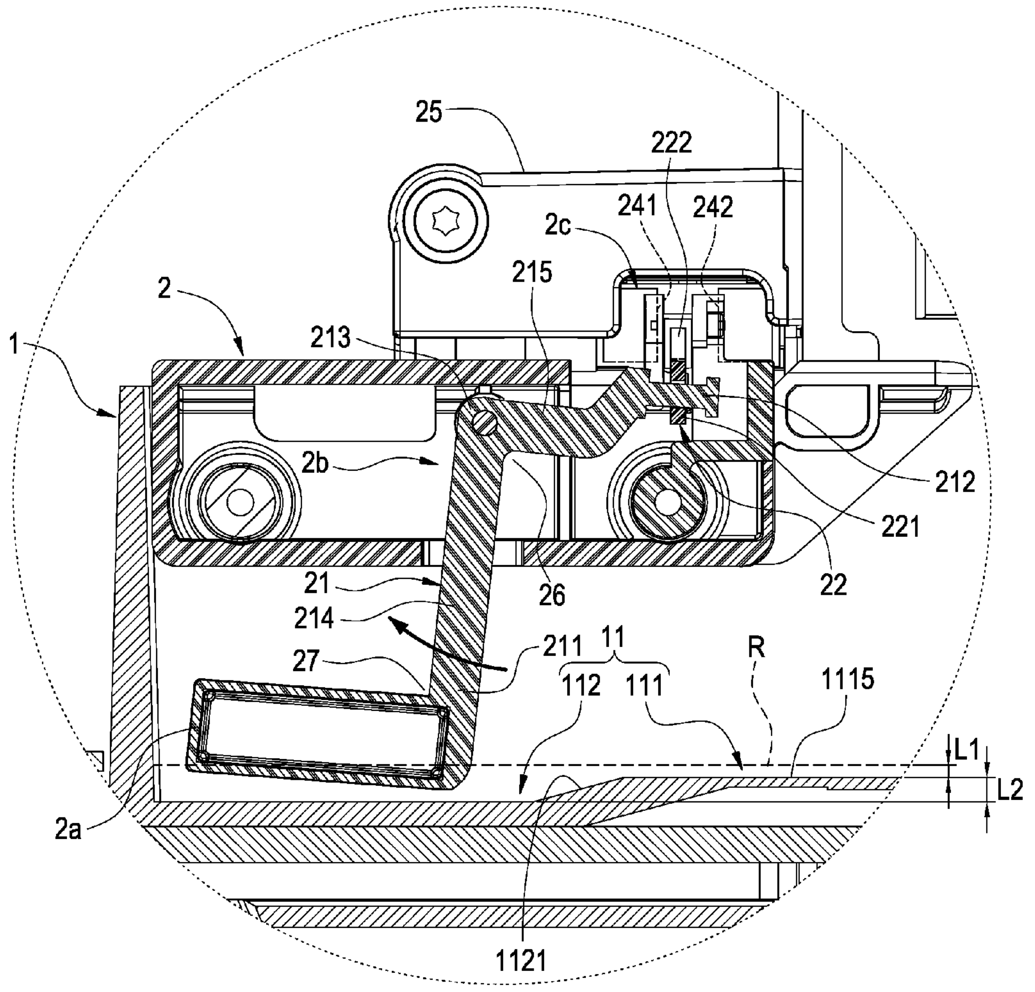
FIG. 10 is a cross-sectional view of the liquid level sensor, after dispensing of the liquid material.

Referring to FIG. 10, when the liquid material R in the accommodating space 11 reaches the foregoing liquid level height L1, the floater 2*a* rises along with the liquid level of the liquid material R to a high point. At this time, the floater 2*a* moves toward a direction opposite to the foregoing direction to make the first linkage 21 move together, thereby driving the second linkage 22 to move, so that the interception portion 222 does not intercept the sensing signal of the sensor 2*c*, which represents that at this time the liquid level is at the predetermined liquid level, and therefore the liquid dispenser 3 is made to stop supplying the liquid material R.

Furthermore, referring to FIG. 7 and FIG. 8, the first linkage 21 is divided into a first arm 214 and a second arm 215 by the first pivot portion 213, and the first arm 214 and the second arm 215 together include a first including angle 26 (see FIG. 9).

Furthermore, one end of the first arm 214 is connected to the floater 2*a*, and the other end of the first arm 214 is connected to the second arm 215 via the first pivot portion 213. The first arm 214 and the floater 2*a* together include a second including angle 27 (see FIG. 9), and the second arm 215 and the floater 2*a* are substantially parallel to each other.

Moreover, a third including angle 28 (see FIG. 8) is included by a portion close to the driving portion 212 on the first linkage 21 and a portion close to the driven portion 221 on the second linkage 22.

Therefore, the first linkage 21 is made to agilely move about the first pivot portion 213 as an axis, and the second linkage 22 is made to agilely move about the second pivot portion 223 as an axis, and the movement of the first linkage 21 agilely drives the second linkage to move together, thereby precisely transmitting the floating movement of the floater 2*a*.

The holder 23 can be a housing. The holder 23 can include a housing base 231 and a housing cover 232, and the housing cover 232 covers and is fixed to one side of the housing base 231.

A first shaft 233 and a second shaft 234 protrude from the housing base 231. The first pivot portion 213 of the first linkage 21 is pivotally connected to the first shaft 233, and the second pivot portion 223 of the second linkage 22 is pivotally connected to the second shaft 234.

The housing cover 232 is formed with a first through hole 235 and a second through hole 236. A free end of the first shaft 233 is inserted into the first through hole 235 to be supported, and a free end of the second shaft 234 is inserted into the second through hole 236 to be supported.

In summary, compared to conventional techniques, the exemplary embodiment of the present invention has the following effects: a) By adding the liquid level sensor 2, the embodiment can automatically supply and automatically stop supplying the liquid material during 3D printing. b) Since the floating force of the floater 2*a* of the liquid level sensor 2 is derived from the liquid level height L1 of the liquid material R in the recess 111 and the depth L2 of the recess 112 filled with the liquid material R, a greater floating force for the floater 2*a* is gained, thereby achieving precisely sensing the liquid level of the liquid material R in the accommodating space 11, and accordingly a thickness of each hard slice can be precisely formed, and consequently a desired three-dimensional solid model can be built. In brief, the exemplary embodiment can automatically and precisely supply or stop supplying the liquid material R without the necessity of dispensing the liquid material R manually, thereby being labor-saving and convenient.

In addition, the exemplary embodiment of the present invention further has effect as follow. The special structure of the linkage member 2*b* enables agile movement so as to precisely transmit the floating movement of the floater 2*a*.

It is to be understood that the above descriptions are merely preferable embodiment of the example embodiment and not intended to limit the scope of the example embodiment. Equivalent changes and modifications made in the spirit of the example embodiment are regarded as falling within the scope of the example embodiment.

What is claimed is:

1. An automatic liquid supply apparatus, for supplying liquid material during 3D printing, the automatic liquid supply apparatus comprising:

a container including an accommodating space for containing the liquid material, the accommodating space including a trench and a recess communicating with each other, the trench including an inner bottom face, the recess being recessed to a depth below the inner bottom face, wherein the trench includes a plurality of inner walls surrounding the periphery of the inner bottom face, and the recess is adjacent to one of the inner walls;

a liquid level sensor including a floater, the floater being disposed corresponding to the recess and floating on the liquid material to generate floating movement along with a liquid level of the liquid material, the liquid level sensor sensing the liquid level of the liquid material in the accommodating space according to the floating movement of the floater; and a liquid dispenser electrically connected to the liquid level sensor, the liquid dispenser selectively supplying or stopping supplying the liquid material into the accommodating space according to the sensed liquid level.

2. The automatic liquid supply apparatus of claim 1, wherein the trench includes a plurality of inner walls surrounding the periphery of the inner bottom face, and the recess is disposed in an including angle area between any two adjacent ones of the inner walls.

3. The automatic liquid supply apparatus of claim 1, wherein an inclined slope is connected between the recess and the inner bottom face.

4. The automatic liquid supply apparatus of claim 1, wherein the floating force is derived from the liquid level of the liquid material in the trench and the depth of the recess filled with the liquid material.

5. A liquid level sensor for an automatic liquid supply apparatus, for sensing a liquid level of liquid material during 3D printing, the liquid level sensor comprising:

a floater floating on the liquid material to generate upward and downward floating movement along with the liquid level of the liquid material;

a sensor producing a sensing signal; and a linkage member including a holder, a first linkage and a second linkage, the first linkage and the second linkage being pivotally connected to the holder, wherein the first linkage includes a connection portion and a driving portion, the connection portion being connected to the floater, the floater driving the first linkage to move; the second linkage includes a driven portion and an interception portion, the second linkage being moved by the driving portion via the driven portion, the interception portion selectively intercepting or not intercepting the sensing signal according to the movement of the second linkage, wherein the second linkage includes a second pivot portion pivotally connected to the holder, the second pivot portion is disposed between the driven portion and the interception portion, and the second linkage is movable about the second pivot portion as an axis.

6. The liquid level sensor for the automatic liquid supply apparatus of claim 5, wherein the first linkage includes a first pivot portion pivotally connected to the holder, the first pivot portion is disposed between the connection portion and the driving portion, and the first linkage is movable about the first pivot portion as an axis.

7. The liquid level sensor for the automatic liquid supply apparatus of claim 6, wherein the first linkage is divided into a first arm and a second arm by the first pivot portion, and a first including angle is included by the first arm and the second arm.

8. The liquid level sensor for the automatic liquid supply apparatus of claim 7, wherein one end of the first arm is connected to the floater, the other end of the first arm is connected to the second arm via the first pivot portion, a second including angle is included by the first arm and the floater, and the second arm and the floater are substantially parallel to each other.

9. The liquid level sensor for the automatic liquid supply apparatus of claim 5, wherein a third including angle is between a portion close to the driving portion on the first linkage and a portion close to the driven portion on the second linkage.

* * * * *